United States Patent
Debergh et al.

(10) Patent No.: US 12,465,090 B2
(45) Date of Patent: Nov. 11, 2025

(54) AEROSOL-GENERATING ARTICLE AND DEVICE FOR IDENTIFYING A SMOKING ARTICLE

(71) Applicant: JT International SA, Geneva (CH)

(72) Inventors: Patrick Debergh, Cressier (CH); Akihiro Kondoh, Geneva (CH); Grzegorz Aleksander Pilatowicz, Grens (CH)

(73) Assignee: JT International SA (CH)

( * ) Notice: Subject to any disclaimer, the term of this patent is extended or adjusted under 35 U.S.C. 154(b) by 350 days.

(21) Appl. No.: 18/009,535

(22) PCT Filed: Jun. 1, 2021

(86) PCT No.: PCT/EP2021/064721
§ 371 (c)(1),
(2) Date: Dec. 9, 2022

(87) PCT Pub. No.: WO2021/249835
PCT Pub. Date: Dec. 16, 2021

(65) Prior Publication Data
US 2023/0346038 A1    Nov. 2, 2023

(30) Foreign Application Priority Data

Jun. 12, 2020 (EP) .................................... 20179616

(51) Int. Cl.
*A24F 40/40* (2020.01)
*A24D 1/02* (2006.01)
(Continued)

(52) U.S. Cl.
CPC ............... *A24F 40/51* (2020.01); *A24D 1/02* (2013.01); *A24D 1/20* (2020.01); *A24F 40/20* (2020.01); *A24F 40/53* (2020.01); *G01D 5/34* (2013.01)

(58) Field of Classification Search
CPC .................... A24F 40/51; A24D 1/20
See application file for complete search history.

(56) References Cited

U.S. PATENT DOCUMENTS 4,766,911 A * 8/1988 Oglesby ............... A24D 1/12
                                                        131/284
2013/0142993 A1    6/2013 Bartram
(Continued)

FOREIGN PATENT DOCUMENTS

CN          102917610 A        2/2013
CN          109068746 A        12/2018
(Continued)

OTHER PUBLICATIONS

International Search Report for PCT/EP2021/064721 mailed Oct. 15, 2021. 3 pgs.

(Continued)

*Primary Examiner* — Eric Yaary
*Assistant Examiner* — Charlotte Davison
(74) *Attorney, Agent, or Firm* — Lerner David LLP

(57) ABSTRACT

An aerosol-generating article includes a consumable section attached to a mouthpiece section. The mouthpiece section includes at least one inner tube having a plurality of light transmitting apertures extending over at least a length in the wall of the inner tube, the plurality being arranged along a circumference of the inner tube. The inner tube is arranged inside a wrapper that is made of a light-scattering material. An aerosol-generating system includes the aerosol-generating article and an aerosol-generating device having a cavity having an opening accessible at the outer body part and being configured to receive the aerosol-generating article. The aerosol-generating device includes at least one illumination system having at least one optical light source arranged to a side of the cavity. The aerosol-generating device also includes an optical reader system, having at least two detectors, for reading information provided by transmitted light by the array of apertures.

16 Claims, 10 Drawing Sheets

(51) Int. Cl.
*A24D 1/04* (2006.01)
*A24D 1/20* (2020.01)
*A24F 40/20* (2020.01)
*A24F 40/50* (2020.01)
*A24F 40/51* (2020.01)
*A24F 40/53* (2020.01)
*A24F 40/60* (2020.01)
*G01D 5/34* (2006.01)

(56) References Cited

U.S. PATENT DOCUMENTS

| | | | |
|---|---|---|---|
| 2013/0221097 A1* | 8/2013 | Day | A61M 5/20 235/437 |
| 2015/0128968 A1* | 5/2015 | Chapman | A24F 7/00 131/329 |
| 2015/0128969 A1 | 5/2015 | Chapman et al. | |
| 2016/0302488 A1* | 10/2016 | Fernando | A24F 40/95 |
| 2018/0042294 A1* | 2/2018 | Jordil | A24D 1/045 |
| 2021/0030056 A1* | 2/2021 | Hwang | A24D 1/02 |
| 2022/0175039 A1 | 6/2022 | Spencer et al. | |

FOREIGN PATENT DOCUMENTS

| | | | |
|---|---|---|---|
| EP | 3120717 A1 | 1/2017 | |
| WO | 2010073122 A1 | 7/2010 | |
| WO | WO-2019185747 A1 * | 10/2019 | A24F 40/53 |

OTHER PUBLICATIONS

Search Report dated Jun. 7, 2025 from the Office Action for Chinese Application No. 202180040941.6 issued Jun. 9, 2025. 3 pages.

* cited by examiner

AEROSOL-GENERATING ARTICLE AND DEVICE FOR IDENTIFYING A SMOKING ARTICLE

CROSS-REFERENCE TO RELATED APPLICATIONS

The present application is a national phase entry under 35 U.S.C. § 371 of International Application No. PCT/EP2021/064721, filed Jun. 1, 2021, published in English, which claims priority to European Application No. 20179616.6 filed Jun. 12, 2020, the disclosures of which are incorporated herein by reference.

TECHNICAL FIELD OF THE INVENTION

The present invention relates to the field of tobacco, in particular to reconstituted tobacco as well as aerosol-generating articles. The present invention further relates to smoking devices, especially to an electrically heated e-liquid system or an electrically heated aerosol-generating system.

BACKGROUND OF THE INVENTION

Electronic cigarettes based on aerosol-generating consumable articles have gained popularity in the recent years. There are mainly two types: liquid vaporizers and heated tobacco inhaler devices. Heated tobacco inhaler devices are referred to as "heat-not-burn" systems (HNB). They provide a more authentic tobacco flavour compared to electronic cigarettes, which deliver an inhalable aerosol from heating of a liquid charge comprising aerosol formers, flavorants, and often nicotine. The HNB system's working principle is to heat a tobacco material comprising an aerosol-forming substance (such as glycerine and/or propylene glycol) which vaporises during heating and creates a vapour that extracts nicotine and flavour components from the tobacco material. The tobacco substance is heated to between 200 and 350° C., which is below the normal burning temperatures of a conventional cigarette. The inhaler device is typically a hand-held heater, which is configured to receive rod-shaped consumable articles.

The recognition of information on products has been important in a number of fields, such as field of medication. An example of a code recognition system for identifying a coding feature of a drug reservoir inserted in a medical delivery device is disclosed in the document US2013/0221097A1. The document describes the general principle of the detection of a code arranged to a drug reservoir that may be detected by optical means or electric, or magnetic means or by the measurement of electrical capacitance. The medical delivery system and method described in US2013/0221097A1 is not adapted to the field of smoking articles as described herein as it requires a cartridge on which a code has to be arranged. Furthermore, US2013/0221097A1 does not provide details of a coding recognition system or method that might be used or adapted to smoking articles that comprise a wrapper.

Illicit trade of aerosol-generating articles, be it e-liquids or HNB articles, is a problem, as counterfeit articles in particular may be of inferior quality, may not guarantee a controlled delivery amount of aerosol or may not be suited to a specifically dedicated aerosol generating system. In order to identify if an aerosol-generating consumable article is an authentic one, a code or equivalent marking containing information about the article may be arranged onto an outer surface of the article, for it to be detected in use or prior use with a certain device. This allows to check for authenticity of the consumable article and in case of negative check, to provide an appropriate control, such as to power off or correctly adjust the heating system with which it is used.

Moreover, there may be also a need for distinguishing a consumable article from another article for the purpose of adapting the aerosol generating conditions. For example, certain consumable articles within a range of articles may contain different constituents (e.g. different tobacco blends, forming agents, nicotine levels, etc.) which so require different parameter settings for the device to optimize the consumer experience.

To provide accurate authentication of a code on a consumable article such as an HNB article, the recognition probability should be very high so that suitable articles will not be rejected. However, existing indicia rely on codes such as classic 1-Dimensional or 2-Dimensional barcodes arranged to an external surface of articles and that may be easily be copied without using specific optical instruments, for example by simply visualizing the code by the human eye. Furthermore, barcodes are limited by the low density of information that may be contained in them.

Various attempts at providing authenticatable aerosol-generating articles have been proposed in the prior art already.

WO2019185747 discloses an e-cigarette comprising an article that includes an indicia, arranged on a surface of the article, and which is indicative of an encoded parameter associated with the article. The e-cigarette also comprises a sensor arrangement to sense the indicium to identify or recognize the article. The fact that an indicium is applied on articles constitutes an additional step, makes the production process complicated and there is also an issue on the stability of inks in a harsh environment such as the one near to a heater as required in an aerosol-generating device.

In US20160302488A1, a smoking article is described comprising an indicium on an outer surface of the smoking article. The indicium may be in the form of one/two dimensional barcodes. The code comprises an identifiable spectroscopic signature but requires the application of a layer by a spray and requires a spectroscope. Also, the signature produced by a spectrum depends on the concentration that may be between 1 ppm and 1000 ppm, the precision of which is difficult to control. A taggant based on a spectroscopic signature is also linked to a spectroscopic measurement and interpretation and calibration issues that may make the taggant not very reliable and there may be issue related to the stability of such a taggant. Adding a spray layer during the manufacturing makes the process considerably more complicated as chemicals have to be handled and applied in a controlled manner.

US2015128969 discusses a mouthpiece embodied as a cartridge of a smoking article of an aerosol-generating device is wrapped using a double layer tipping wrap. The outer layer of the double-layer tipping wrap includes indicia that identify properties of the mouthpiece and a smoking article. The outer layer can be in the form of an adhesive label. The outer layer of the double-layer tipping wrap includes indicia that identify properties of the mouthpiece and a smoking article. The indicia provide information such as flavor(s) and product source identification. The fact that an indicium has to be applied onto a layer of the article, constitutes an additional step and makes the production process complicated and more expensive. The applied indicium may also be easily identified and reproduced as it is easily observable.

There is thus a need for an improved technique to allow authentication of aerosol-generating articles such as HNB, vaping and smoking articles. There is a need for identification methods that are much simpler than all the indicia marking of prior art, and which furthermore should not be directly visible. There is also a need for an identification solution that is more robust and less subject to alteration or damage such as due to heat.

SUMMARY OF THE INVENTION

The inventors of the present invention have found solutions to the above-discussed problems by providing an authentication method and system of identification that does not require the use of added or incorporated indicia onto or into a consumable product, and which furthermore is not directly visible without using optical means such as a light source and a detection system.

The proposed solution is based on apertures that are realized into an inner tube of an article. The apertures are furthermore arranged so as to constitute a readable identification code. This allows to provide an inherent available reference, defined as identification code, by which a consumable may be recognized at its consumption. Furthermore, the method allows to provide a cheap and extremely secure individual recognition of aerosol-generating consumables.

More precisely, the invention is achieved by an aerosol-generating article, comprising a consumable section attached to a mouthpiece section. The mouthpiece section comprises a machine-readable pattern representing a coded data. The mouthpiece section comprises at least one inner tube and has an inner tube surface and an outer tube surface. The inner tube is arranged inside wrapper. The machine-readable pattern comprises a plurality of light transmitting apertures extending over at least a length in the wall of said inner tube and arranged preferably along a circumference of said inner tube. Alternatively, or additionally, the plurality of apertures extends along a longitudinal direction of the inner tube. Furthermore, the wrapper may be made of light scattering material.

In advantageous embodiments the apertures may be small apertures that diffract incident light on them, for example apertures having a maximal cross-sectional dimension or diameter between 2 mm and 50 µm, preferably between 1 mm and 65 µm, most preferably between 500 µm and 100 µm. The apertures may be produced by laser. The minimum hole diameter realized by a micro laser is typically 0.070 mm. With a macro laser, the minimum diameter is typically 0.160 mm. In a variant, an array of apertures may represent a sign, an image, or a symbol such as a letter.

The inner tube may be made of paper, polymer, or a combination thereof. The inner tube has a thickness preferably greater than the thickness of the wrapper. The inner tube may be positioned between an aerosol generating portion and a filter portion of the consumable article. The inner tube forms a spacer between the aerosol generating portion and the filter portion or mouth end, which size is determined to allow the temperature of the vapor to decrease as it circulates therethrough. The inner tube may be hollow or filled with a porous filling material such as light meshed material, non-woven material, honeycomb or open-cell material and the like. The insertion of a filling material may increase the contact surface with vapor in the tubular member to enable a shorter length the tube. The aerosol generating material may be a tobacco-based material such as reconstituted tobacco in any suitable form such as gathered sheet, strands, strips, powder, sponge or foam.

The inner tube is arranged inside a wrapper that is made of a light-scattering material. Preferably the wrapper is preferably made of paper. Paper is a highly scattering material allowing to provide a great flexibility of the positioning of a light source relative to a detector system in an aerosol generating device In an embodiment said inner tube is made of a light-scattering material. In variants the tube may be made of an optical opaque material or a material that has a partial light transmission. Using an opaque layer arranged to an inner tube increases the contrast of the detection signal of the identification code compared to a translucent or transparent material.

In an embodiment, said tube and wrapper are made of different materials and have different light scattering properties. Using different materials allows to provide a greater design flexibility and improve the detection reliability of the identification code.

In an embodiment, said tube and/or said wrapper is made at least partially of paper and preferably have a different thickness.

In an embodiment, at least one light absorbing layer having through-apertures is arranged to the inner tube. The apertures of the absorption layer are aligned with said light transmitting apertures. Light transmission apertures may have any cross-section shape, preferably cylindrical shapes cross-sections. Light transmission apertures are preferably arranged on a complete circumference of an inner tube of a consumable, which allows to detect the related identification code independent of the angular orientation of a consumable article in a device.

In an embodiment said wrapper and/or said tube is made of at least two layers. At least one layer of the wrapper is a light diffusing layer. In variants a scattering layer may be arranged between said inner tube and said wrapper or be an inner layer of the wrapper. A scattering layer between the inner tube and wrapper allows to provide a higher scattering effect. The scattering layer may be designed to enhance the scattering effect at certain wavelengths, such as blue light. In advantageous embodiments an optical filter layer may be arranged onto said inner tube and/or said wrapper. Arranging an optical filter layer, such as an optical absorption filter allows to improve the contrast of light that passes through the apertures and in-between the apertures.

In an embodiment at least a portion of at least one of said wrapper and/or inner tube layers is made of polylactic acid (PLA), cellulose paper, starch and combinations thereof.

In an advantageous arrangement, the inner tube comprises a fluorescent substance that emits light upon radiation with for example UV light. In such a case the light beams provided by the apertures may be much less visible, allowing to detect their presence as dark regions imposed on a substantial uniform light beam scattered by the wrapper. The holes in such an embodiment are detected by dark areas in the intensity distribution.

In an embodiment said apertures are arranged according to at least N parallel arrays arranged on a circumference and/or axial length of said inner tube, N being equal or greater than 2.

In an embodiment at least two of said N arrays have M different distances of separation between the apertures of the array, M being equal or greater than 2.

In an embodiment, the N arrays are distributed with a spacing of variable distance.

In an embodiment, at least a first array of the N arrays has different shape and/or size of apertures compared to a second array of the N arrays.

In an embodiment at least two of said N arrays comprises apertures that are not aligned on the same virtual line that is orthogonal to the plane formed by said at least two arrays. In embodiments, the apertures may have a curved shape or may have a conical shape. The shape of said apertures may vary along the thickness of the inner tube.

In a second aspect the invention is achieved by an aerosol-generating system comprising an aerosol-generating article as described, and an aerosol generating device. The aerosol generating device comprises a power supply section and a cavity arranged in an outer body part, the cavity defining a cavity axis having an opening accessible at the outer body part and being configured to receive an aerosol-generating article.

The aerosol-generating device further comprises at least one illumination system comprising at least one optical light source arranged to a side of said cavity.

The aerosol-generating device further comprises an optical reader system comprising at least two detectors, for reading information provided by transmitted light by said array of apertures.

In an embodiment, at least one of said detectors has a lateral dimension smaller than a largest diameter of projected light beams incident on said detectors. Using a plurality of detectors that have a dimension smaller than the diameters of the light beams impinging on the detectors allows to provide detection schemes having an important resolution and high detection probability of the hidden codes provided by the apertures.

In an embodiment, the angular aperture of the detectors is chosen so that light from more than 2, preferably more than 5, more preferably more than 10, even more preferably more than 20 apertures and/or more than 2 arrays of apertures may be detected by said optical reader system.

In an embodiment said detector system is configured for detecting a spatial frequency and/or at least one optical phase of the transmitted light beams. Detecting intensity signals and converting them to a signal related to a frequency allows to provide a simple and very reliable detection scheme.

In an embodiment, said array of detectors comprises at least 3 detectors having different angular separations, defined relative to said cavity axis.

The invention is further defined as in the appended claims.

DETAILED DESCRIPTION OF THE INVENTION

Figure 1:
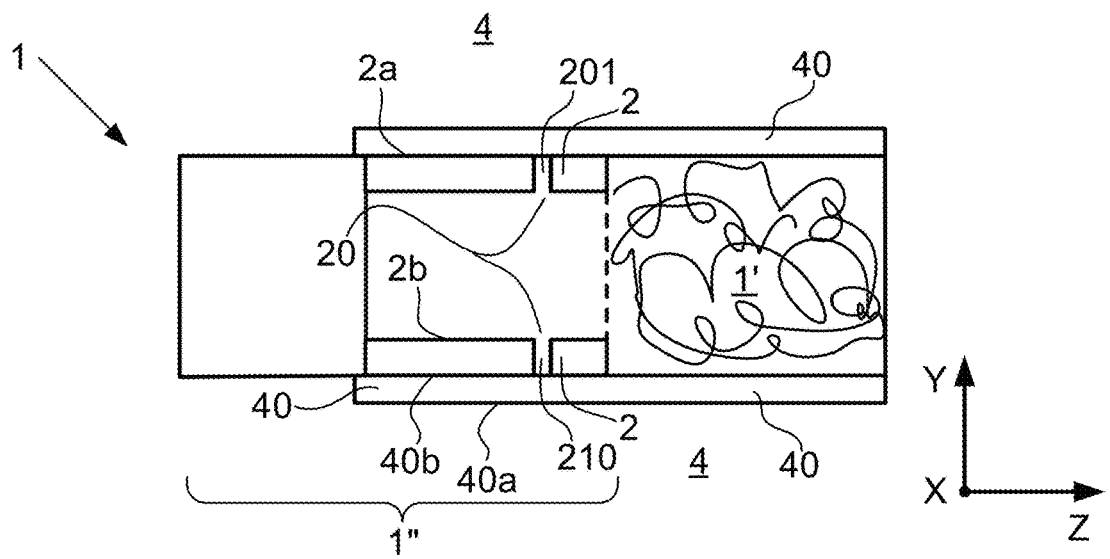
FIG. 1 shows a schematic representation of a longitudinal cross section of an aerosol-generating article of the invention, comprising an inner tube comprising apertures and a light diffusing wrapper.

The present invention will be described with respect to particular embodiments and with reference to the appended drawings, but the invention is not limited thereto. The drawings described are only schematic and are non-limiting. In the drawings, the size of some of the elements may be exaggerated and not drawn on scale for illustrative purposes.

The dimensions and the relative dimensions do not correspond to actual reductions to the practice of the invention.

The invention will be described in the following examples in relation to tobacco-based consumable articles but the scope of the invention shall not be construed as limited to tobacco based consumable articles but shall encompass any aerosol-generating consumable articles, such as smoking articles, heat-not-burn articles, e-liquid cartridges and cartomizers, which comprises an aerosol-generating substrate capable to generate an inhalable aerosol upon heating. Aerosol-generating articles 1, or articles 1, of the invention are also defined herein as consumables 1 or consumable articles.

As used herein, the term "aerosol-generating material" refers to a material capable of releasing upon heating volatile compounds, which can form an aerosol. The aerosol generated from aerosol-generating material of aerosol-generating articles described herein may be visible or invisible and may include vapours (for example, fine particles of substances, which are in a gaseous state, that are ordinarily liquid or solid at room temperature) as well as gases and liquid droplets of condensed vapours. The aerosol generating material may be a tobacco-based material such as reconstituted tobacco in any suitable form such as gathered sheet, shredded, sponge or foam. Aerosol generating material are preferably based on the use of aerosol generating substance, for example tobacco, aerosol formers, binders, flavouring agents, nicotine and combinations thereof. An aerosol-forming substrate may be provided in a stable support. Such a support may be in the form of a powder, granules, small strips, sheets or foam.

Manufactured aerosol-generating consumable article 1 define a virtual insertion axis Z may have a cross section of any regular or irregular shape, and can have, for example, an elliptical or circular cross-section, defined in a plane orthogonal to a longitudinal axis. Articles define lateral cross sections planes X-Y that are orthogonal to said virtual insertion axis Z (FIG. 1). A longitudinal cross section is defined in a X-Z or Y-Z plane.

The term "wrapper" herein is a light scattering or diffusing tube, rolled sheet or layer that is defined broadly as any layer or layers or tube that protect an inner tube and possibly also a section of the article that contains a charge of aerosol-generating material, and which allows to handle them. It has an inner surface that may be in contact with the aerosol-generating material and has an outer surface away from the aerosol-generating material. The wrapper may preferably comprise a cellulose based material such as cellulose paper (including cardboard) and/or cellulose acetate. The wrapper may also be made of a biodegradable polymer or may be made of glass or a ceramic. A wrapper may be a porous material and may have a smooth or rough outer surface and may be a flexible material or a hard material. The wrapper as defined herein covers at least a portion of an inner tube and may also cover other members of an aerosol-generating consumable article 1. The wrapper may be in contact with the inner tube, but not necessarily so.

Figure 3A:
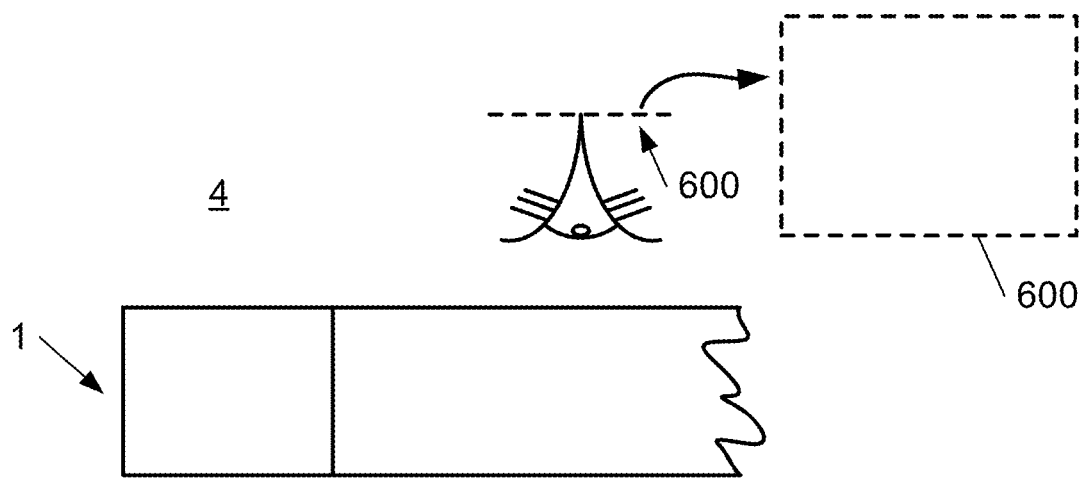
FIGS. 3a,b illustrate the optical effect of a consumable article according to the invention: i.e. the identification code that is comprised in the arrangement of apertures in an inner tube, may not be seen or detected from the outside of the article without illumination of the apertures by a light beam that crosses a portion of the article.
Figure 3B:
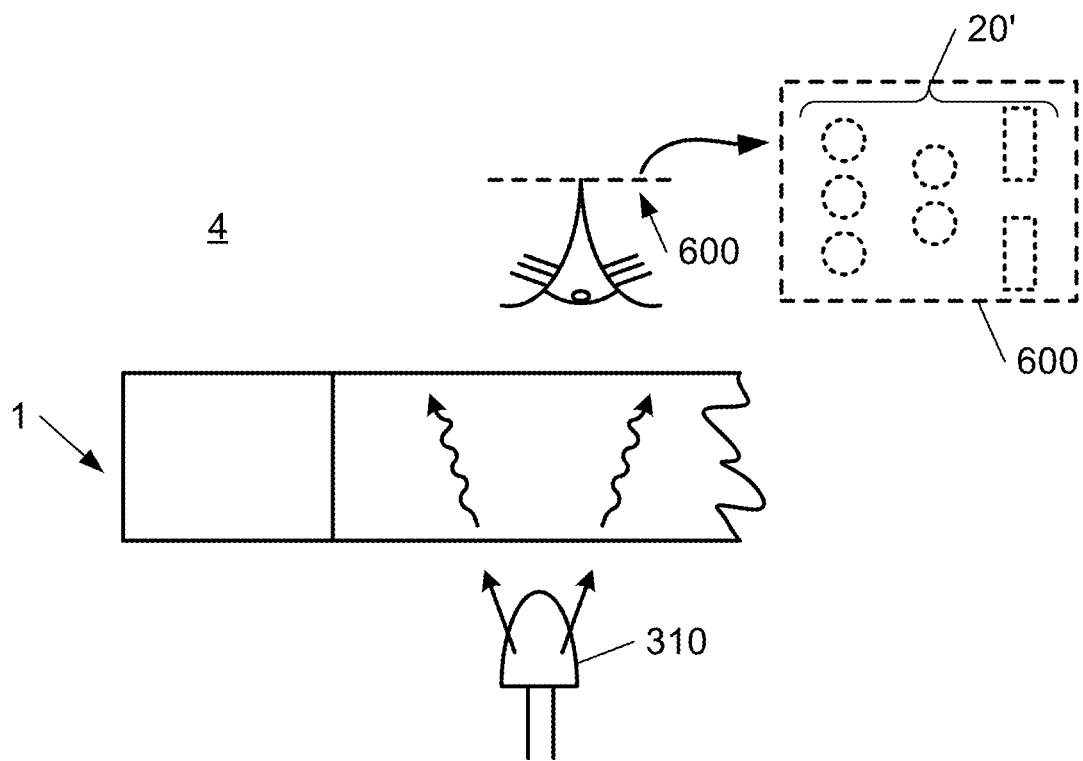
Figure 4:
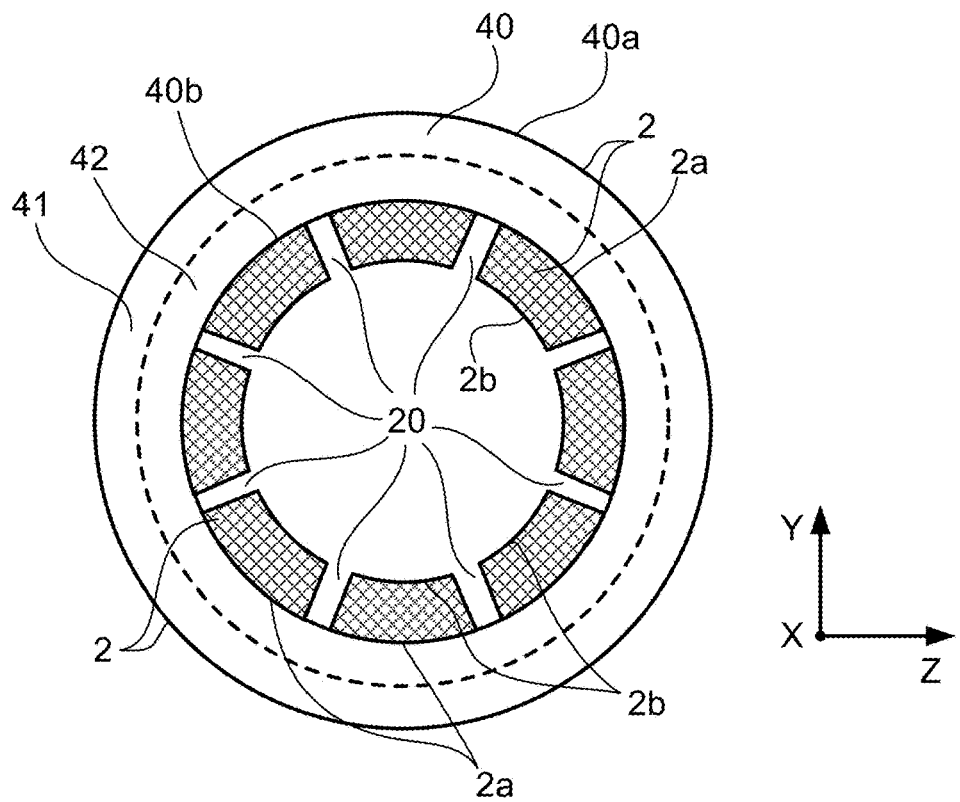
FIG. 4 illustrates an aerosol generating article with a wrapper that comprises at least two layers.

The term "light diffusing" herein means the diffusion or scattering of light, in the sense that a light beam impinging on a light diffusion layer is scattered by the composition of the layer so that the layer is not transparent like a transparent optical plate. More precisely, a light diffusion layer as used herein does not allow to see through it by the human eye or by direct vision using a camera, relying only on illumination by a light source placed to the side of the observer or camera. Said otherwise, a "light diffusion or scattering layer" herein means that the layer is opaque in direct vision, as illustrated in FIG. 3a, using only reflected light, similar to the effect of a piece of paper. Still more precisely, a light diffusion wrapper does not allow to see through it, or to observe directly the presence of an element or layer without using back- or side-lightning of the wrapper as illustrated in FIG. 3b which illustrated the observation or detection of apertures in an inner tube arranged inside a wrapper. In the invention, apertures in the wall of an inner tube are invisible in normal lighting because they are covered by an outer wall, and therefore can be qualified as a "covert" feature and constitute a hidden identification code.

Herein, the term "visible" or "detectable" means that the member to be observed or detected may be observed at specific wavelength ranges, for example in the visible wavelength range. There is no limit to any wavelength range which may be in the UV, the visible or infrared wavelength range, in as far that in that wavelength range the apertures in the tube that are an object of the invention may not be observed or detected without using a light source that provides an illumination beam to the inner tube and the wrapper arranged on the inner tube. As the effect of the invention relies on the illumination of an inner tube, comprising apertures, by scattered light, the position of the light source is not critical and can be arranged anywhere in the space 4 around a circumference and/or axial length of a consumable as commented further in detail.

The apertures in the inner tube of the consumable of the invention become visible or detectable thanks to 2 effects:
- the outer wall thickness is thin enough so that scattered light may be passed through the inner tube and the wrapper surrounding the inner tube;
- the wrapper layer acts as a diffuser for the incoming light, so that the angular orientation of an illuminating light source is not critical as described in detail further. The inner tube may be a partial transparent layer or a diffusing layer as described in detail further The term "inner tube" is a tubular member in the aerosol-generating consumable. It is covered by a light diffusing member, preferably the wrapper as aforementioned. The inner tubular member may be a paper or polymer tube of thickness greater than the thickness of the wrapper. The tubular member may be positioned in the longitudinal direction between an aerosol generating portion and a filter portion of the consumable article. The tubular member may have the function of cooling the temperature of the vapor circulating therethrough. The tubular member may be hollow or filled with a porous filling material such as light meshed material, nonwoven material, honeycomb or open-cell material and the like. The tube may be formed from a rolled sheet of material glued at a longitudinal seam or may be formed by other techniques such as extrusion. The insertion of a filling material may increase the contact surface in the tubular member to enhance the cooling effect. The aerosol generating material may be a tobacco-based material such as reconstituted tobacco in any suitable form such as gathered sheet, strands, strips, powder, sponge or foam. The inner tubular member may have any cross-section shape or any ratio between the thickness of its tube wall and the diameter of the tube. The inner tube may have a non-uniform diameter and may have, for example a conic shape. The inner tube may also be made of discontinuous portions, such as two different tuber member having a different diameter or different outer or inner shape.

The tubular member is preferably, like the wrapper, a light diffusing tube but not necessarily so. As further described in detail the inner tube may be made of a light absorbing material or may even be transparent because the apertures may create a diffraction effect allowing to detect them by illumination that traverses a section of the consumable.

As used herein, the term "light" comprises light beams having wavelengths that are preferably smaller than 20 µm, which is the limit of the far infrared part of the electromagnetic spectrum.

The term "hole" and "apertures" as used herein may be through-holes or may be partial holes or steps arranged in the wall of a tube member. Apertures may be millimeter sized apertures or may be micrometer-sized apertures.

Figure 2:
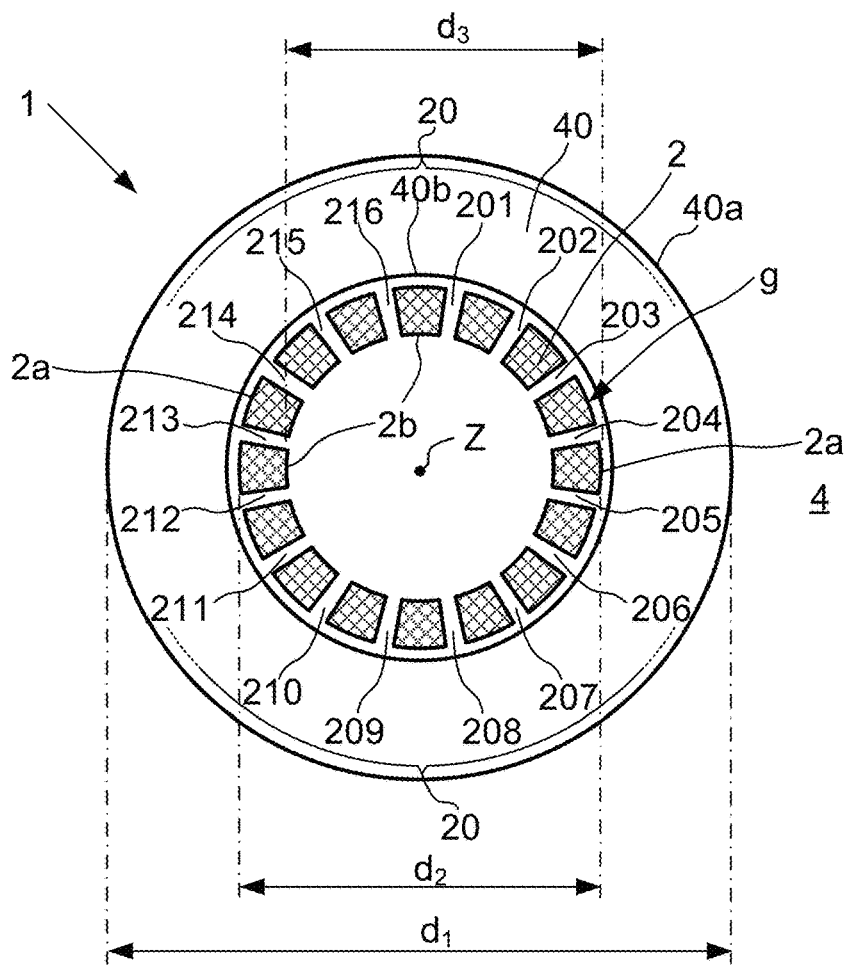
FIG. 2 illustrates a transversal cross section of the aerosol generating article of the embodiment of FIG. 1.

More precisely, the invention is achieved by an aerosol-generating article, comprising a consumable section attached to a mouthpiece section. The mouthpiece section comprises at least one inner tube 2 and has an inner tube surface 2b and an outer tube surface 2a. As illustrated in FIGS. 1 and 2 the inner tube 2 comprises a plurality 20 of light transmitting apertures 201-216 extending over at least a length in the wall of said inner tube and arranged preferably along a circumference of said inner tube as illustrated in FIG. 2.

The wrapper 40 that covers the inner tube 2 may be a single layer or may comprise at least two layers 40a, 40b as illustrated in FIG. 3. One of these layers 41, 42 may cover other members of an aerosol-generating article and not only said inner tube 2. For example, in FIG. 1 the wrapper covers a portion of the mouthpiece 1" and the consumable section 1'.

Figure 5:
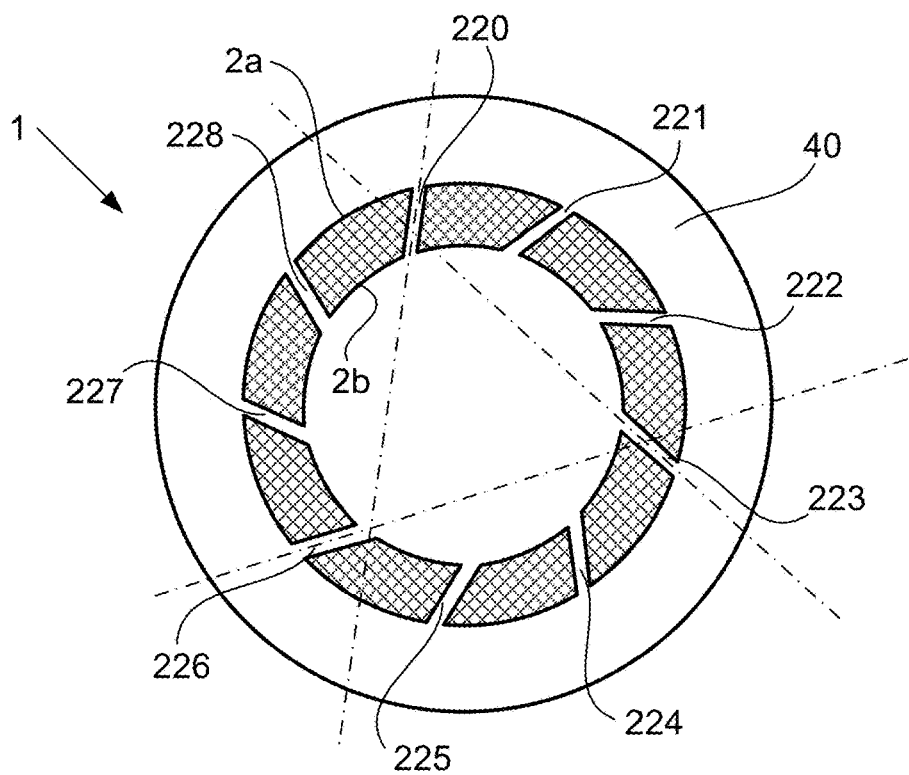
FIG. 5 illustrates an article having oblique oriented apertures in the inner tube.

In embodiments, the plurality apertures 20 may have a variety of shapes and/or orientations. FIG. 5 illustrates an embodiment of an inner tube 40 comprising through-apertures 221-228 which longitudinal projection does not intersect a central axis Z of an article 1.

In embodiments the outer wrapper 40 has an inner surface 40b that is in contact with the outer surface 2a of the inner tube 2. In variants, at least one additional layer may be arranged between the inner tube 2 and the wrapper 40. Such an additional layer may be a glue, seam or bond layer or a spacer layer. Such additional layer, not illustrated in Figures, is at least partially transparent to incident light and may be a light diffusing layer and may be a layer that has optical absorption characteristics.

In advantageous embodiments, the apertures may be very small apertures that diffract incident light on them, for example apertures having a maximal cross-sectional dimension or diameter comprised between 2 mm and 50 µm, preferably between 1 mm and 65 µm, most preferably between 500 µm and 100 µm. The apertures may be produced by laser. The depth of the apertures, if not performed through the full thickness, may be typically between 100-800 microns, but may be smaller than 100 µm.

The inner tubular member 2 may be a paper or polymer tube of thickness greater than the thickness of the wrapper. The tubular member may be positioned between an aerosol generating portion and a filter portion of the consumable article. The tubular member may have the function of cooling the temperature of the vapor circulating therethrough. The tubular member may be hollow or filled with a porous filling material such as light meshed, nonwoven material, honeycomb or open-cell material and the like. The insertion of a filling material may increase the contact surface in the tubular member to enhance the cooling effect. The aerosol generating material may be a tobacco-based material such as reconstituted tobacco in any suitable form such as gathered sheet, strands, strips, powder, sponge or foam.

The inner tube 2 is arranged inside a wrapper 40 that is made of a light-scattering material. Preferably the wrapper is made of paper or cardboard.

In an embodiment, said inner tube 2 is made of a light-scattering material. In variants the inner tube 2 may be made of an optical opaque material or a material that has a partial light transmission In an embodiment the inner tube 2 and wrapper 40 are made of different materials and have different light scattering properties.

In an embodiment the tube 2 and/or the wrapper 40 is made at least partially of paper and preferably have a different thickness.

Wrappers 40 and inner tubes 2 may have the following typical dimensions. The outer circumference of the article may be comprised between 16 and 25 mm, preferably between 17 and 22 mm. The inner circumference of the inner tube may be between 10 and 20 mm. The thickness of the inner tube may be between 0.2 and 1.5 mm, preferably between 0.3 and 1 mm and the thickness of the wrapper may be between 50 and 250 microns, preferably between 60 and 120 microns. It can be made of paper. The grammage of paper for the wrapper may be between about 15 and 80 g/m2. The grammage of paper for the inner tube may be between about 50 and 180 g/m2.

Apertures may be circular shaped apertures but may have other shapes such as rectangular shaped apertures. Apertures of aperture arrays 20, 20', 20" may be at least partial conical apertures.

Figure 6:
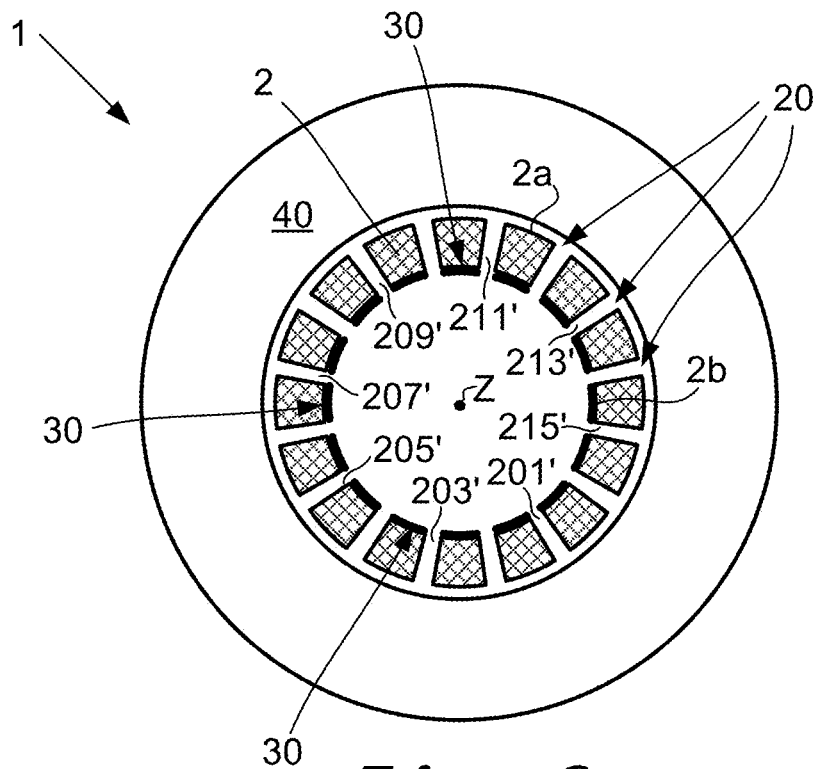
FIG. 6 illustrates a lateral cross-section of an article of the invention comprising an absorbing layer arranged inside an inner tube, the absorbing layer having a plurality of through-holes.

In an embodiment, illustrated in FIG. 6, the inner tube 2 comprises at least one light absorbing layer 30 having through-apertures 201'-211'. The apertures of such an absorption layer 30 are aligned with the plurality 20 of light transmitting apertures 201-216, 220-216. Apertures 201'-211' in an absorption layer 30 are preferably through-apertures. Apertures 201'-211' in an absorption layer 30 may be wider or smaller that the apertures 201-216, 220-216 of the inner tube 2.

An absorption layer 30 may be a separate layer that is arranged to the inner tube, or it may be a deposited layer such as an ink layer or any layer that is either completely opaque or that has a partial transmission for the wavelengths of the light that is used to detect the presence and/or shape and/or arrangement of said apertures.

In an embodiment, the inner tube 2 is made of at least two layers (not illustrated in Figures). At least one layer of the inner tube 2 may be a light diffusing layer.

In an embodiment at least a portion of at least one of said wrapper and/or inner tube layers is made of polylactic acid (PLA) or cardboard.

In an advantageous arrangement, the inner tube 2 may comprise a fluorescent substance that emits light upon radiation with for example UV light. This allows to realize possibly a huge difference in the transmitted light beams directed to a detector, because the apertures 201-216, 220-216 in such an example do not comprise fluorescent substance. In such a case the light beams provided by the apertures 201-216, 220-216 may be much less visible, allowing to detect their presence because their surroundings provide much more light intensity. For example, an UV light source may irradiate, through an article 1, the inner tube 2 which may provide secondary light beams in the visible region. The apertures 201-216, 220-216. In such an embodiment (not illustrated) may be detected by dark areas in the intensity distribution of the scattered light provided by the wrapper 40.

Figure 16A:
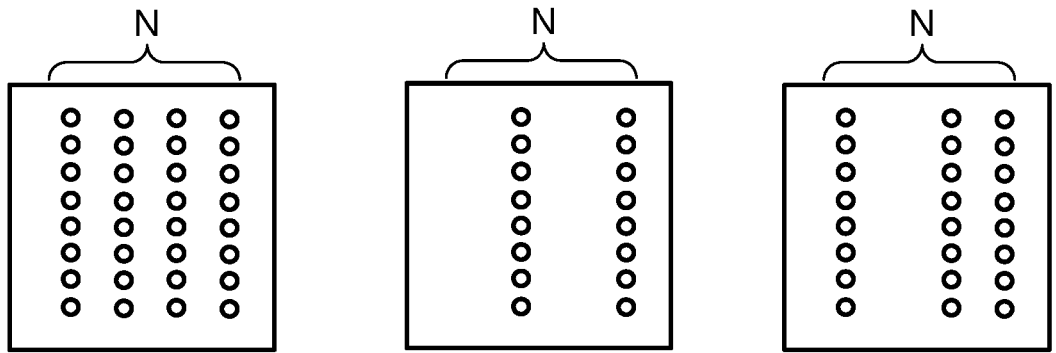
FIG. 16 a, b illustrate different hole arrangements of an inner tube of a consumable article, the hole arrangement constituting a detectable and readable code.
Figures 17A, 17B, 17C:
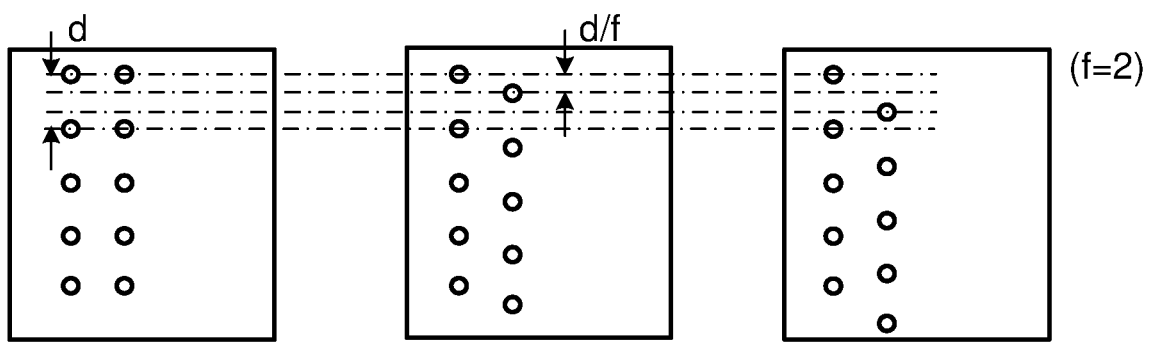
FIGS. 17 a-c illustrate hole arrangements comprising hole arrays that present a relative displacement in the sense of the length of the hole arrays.

In an embodiment, illustrated in FIGS. 16a, b and FIGS. 17a-17c the plurality 20, 20', 20" of apertures 201-216, 220-216 are arranged according to at least N parallel arrays arranged on a circumference of said inner tube, N being equal or greater than 2.

Figure 16B:
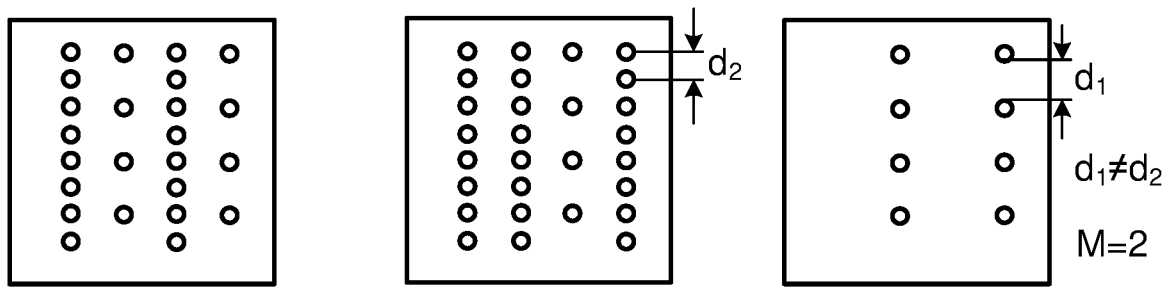

In an embodiment, at least two of said N arrays have M different separations between the apertures 201-216, 220-216, M being equal or greater than 2. For example, FIG. 16b illustrates and arrangement wherein 4 columns of apertures comprise a plurality of apertures that may be arranged according to two different separation distances d1, d2, so in such case N is equal to 4 and M is equal to 2.

In an advantageous embodiment, illustrated in FIGS. 17a-c, at least two of said N arrays comprises apertures 201-216, 220-216 that are not aligned on the same virtual line that is orthogonal to the plane formed by said at least two arrays. The level of unalignment defines the phase between arrays of aperture which can be identified as a fraction f of a predetermined separation distance. For example, in FIG. 17b and FIG. 17c the phase is equal to ⅓rd of the separation distance d1 of the apertures 201-216, 220-216 of a first column of apertures.

In embodiments that are not illustrated, apertures 201-216, 220-216 may be arranged along a curve defined on the circumference of an inner tube, for example a sinusoidal or helicoidal curve.

Figure 7:
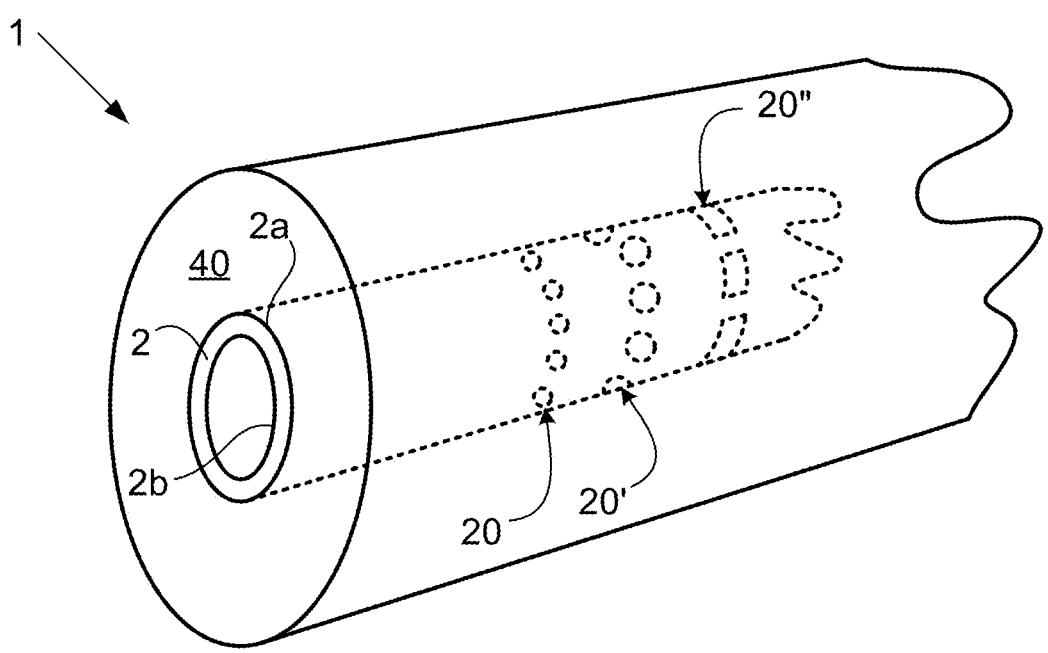
FIG. 7 illustrates an embodiment of a consumable article comprising an inner tube member having in its wall at least three different arrays of apertures.
Figure 8:
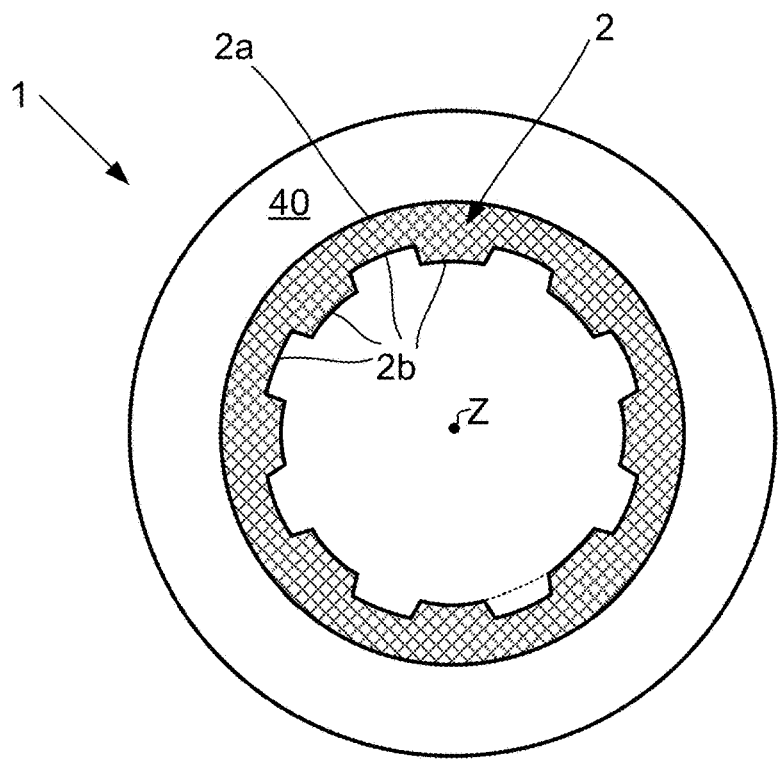
FIGS. 8 and 9 illustrates an inner tube having apertures having a depth that is a fraction of the thickness of the wall of the inner tube.
Figure 9:
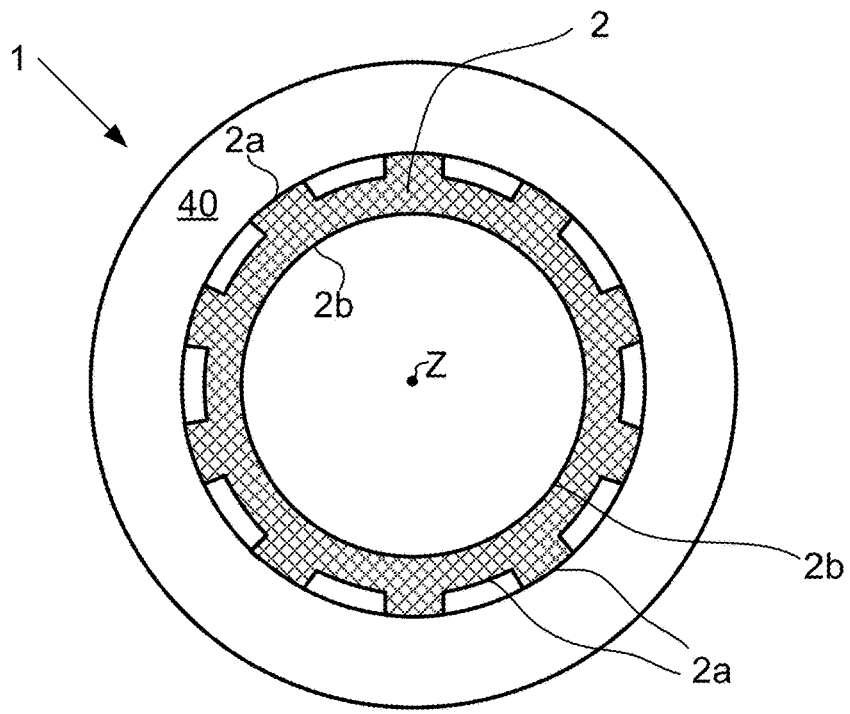

In advantageous embodiments, as illustrated in FIG. 7, arrays of apertures 20, 20', 20" may comprise different types of apertures. For example, a first and second plurality of apertures 20, 20' may be apertures that have a circular cross section and a third plurality of apertures 20" may be apertures that have a rectangular or other polygonal cross-section.

Figure 18:
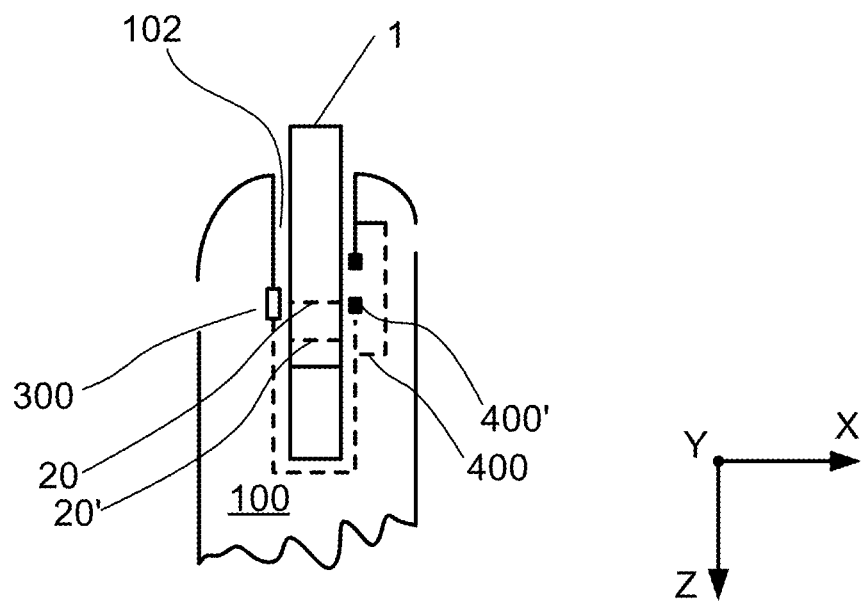
FIG. 18 illustrates an aerosol generating system comprising an aerosol generating device comprising an illumination and detection system for detecting and decoding information of a plurality of apertures of an inner tube of an article of the invention.

In a second aspect the invention is achieved by an aerosol-generating device 100 and by an aerosol-generating system comprising an aerosol-generating article 1 as described and said aerosol-generating device 100. The aerosol-generating device 100 comprises, arranged in an outer body part, a power supply section (not illustrated) and a cavity 102 having an opening accessible at the outer body part and configured to receive an aerosol-generating article. 1 as described. FIG. 18 illustrates a partial view on a typical aerosol-generating system of the invention, comprising said aerosol-generating device 100 and said aerosol generating article in its inserted position into said aerosol generating device 100.

The aerosol-generating device 100 comprises at least one illumination system 300 comprising at least one optical light source 310 providing at least one light beam 320 and a detection system 400 arranged to preferably opposite sides of the cavity 102.

Figure 10:
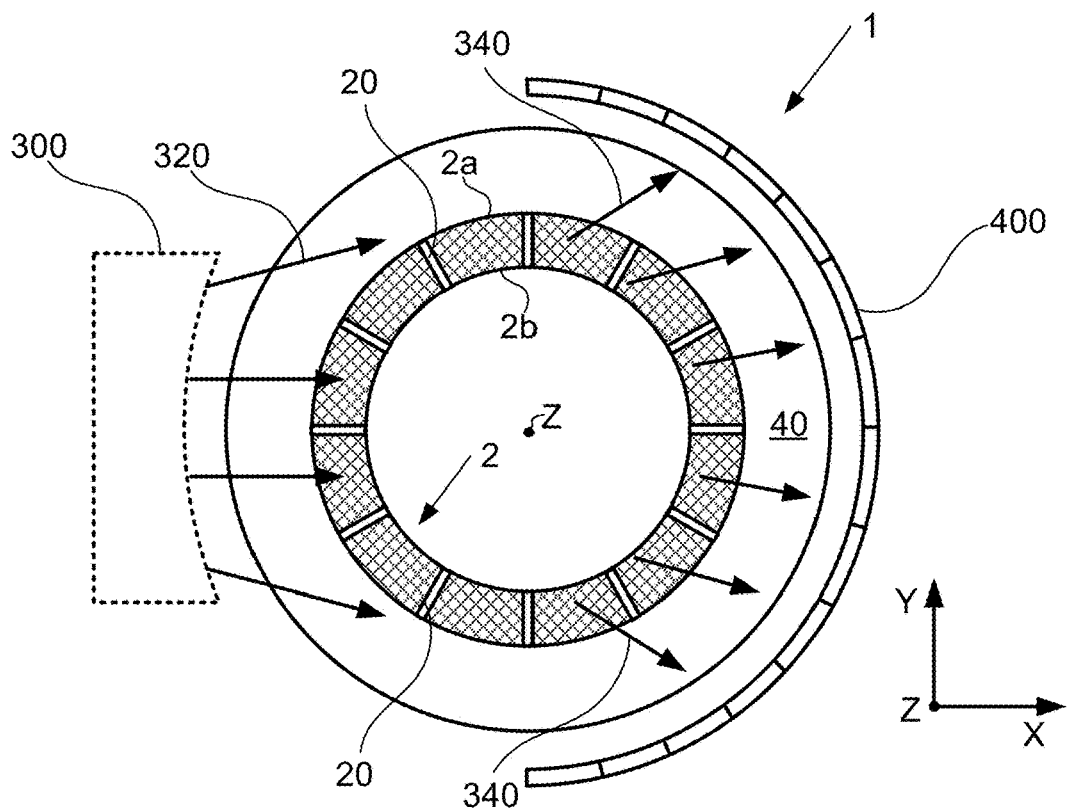
FIG. 10 illustrates a configuration of an aerosol generating device comprising an illumination system to illuminate by scattered light the apertures of the inner tube and an array of light detectors.
Figure 12:
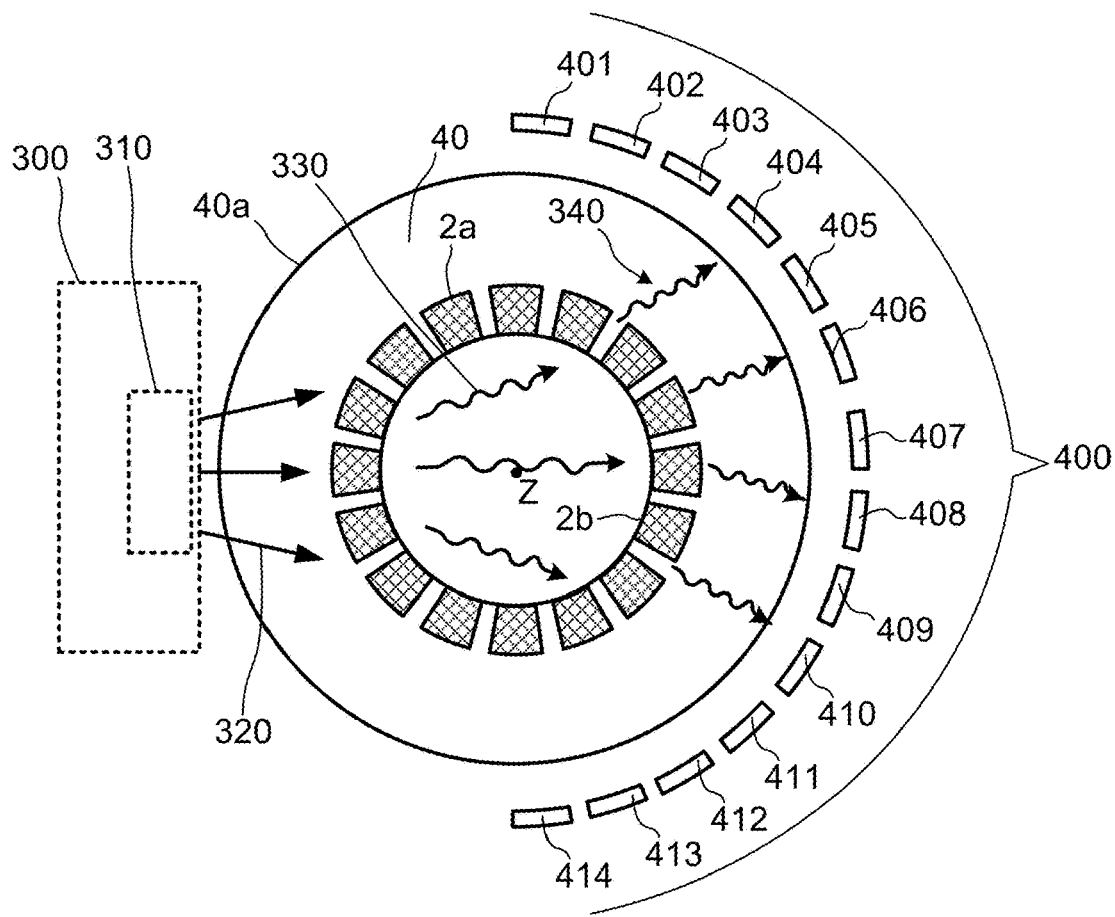
FIG. 12 illustrates a configuration of an aerosol generating device comprising a light source and an array of light detectors that are arranged to opposite sides of a consumable article. The figure illustrates further the transmission of scattered light through an inner tube and through a wrapper.

FIG. 10 and FIG. 12 illustrate configurations of an aerosol generating device 100 comprising an illumination system 300 and an array 400 of light detectors 401-414 for reading information provided by transmitted light by the plurality 20, 20', 20" of apertures 201-216, 220-216. The illumination system 300 and detector system 400 may be arranged in different places in a device 100. For example, FIG. 10 and FIG. 12 illustrates a preferred configuration wherein at least one light emitting system 300 is arranged opposite to the detector system 400.

FIG. 12 illustrates the light 340 progressing into a wrapper 40. A portion of that light is transmitted by the apertures 201-216, 220-216 and another portion is transmitted by the other wall portions, in between said apertures, of the inner tube 2.

In an advantageous embodiment, at least one of said detectors 402-414 of a detection system 400 has a lateral dimension smaller than a largest diameter of projected light beams 351-353, 351'-354' on the array of detectors 401-414.

The illumination system 300 comprises at least one illumination source 310 that may be a direct light source such as a light emitter. The light source 310 may be also the extremity of an optical element (not illustrated herein) such as the extremity of an optical waveguide or a tip of an optical element that comprises a fluorescent material which is illuminated by an energy or light source placed away from the light emitting element. A light emitting system 300 comprises preferably a light source 310 that may be any UV, visible or infrared light source, or a combination of such sources. Due to the very limited space available in aerosol-generating devices 100, light sources 310 are preferably semi-conductor light sources such as LEDs, SLEDs or semiconductor light sources.

In a variant, the light source 310 in the invention may be an infrared light source. The light source may be generated by the heater of the aerosol-generating device 100 or be a separate light source.

Figure 11:
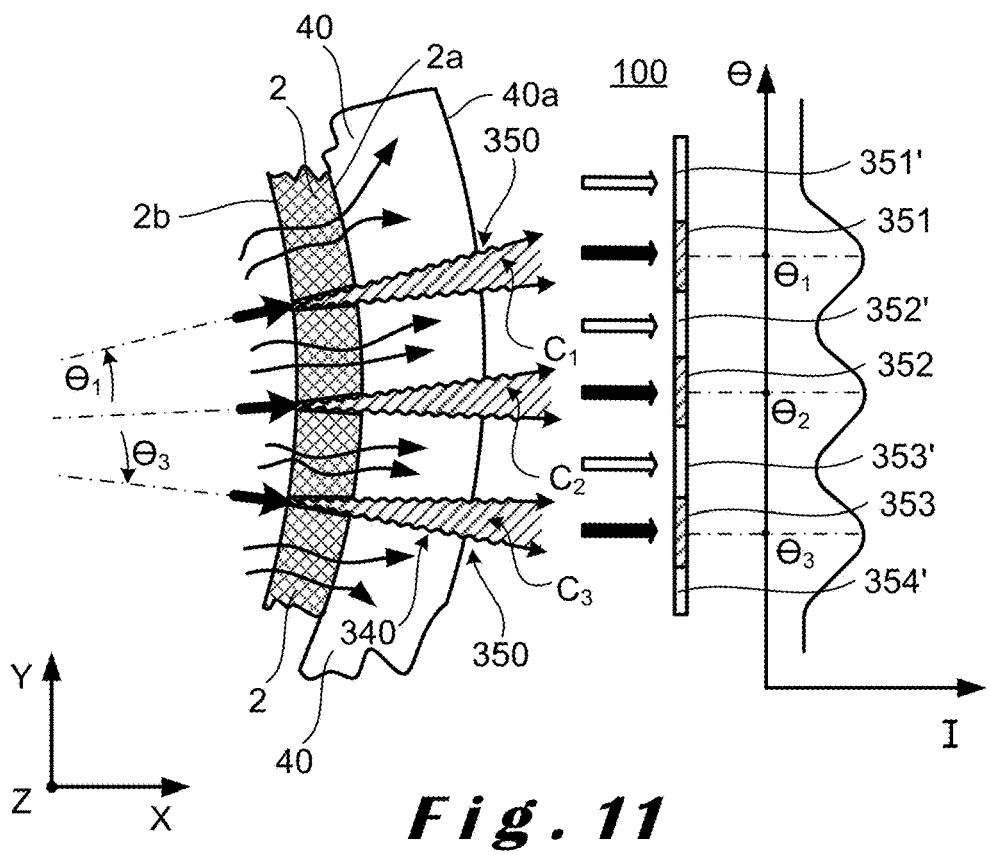
FIG. 11 illustrates the illumination of though-holes of an inner tube and a plurality of light beams that pass through an inner tube and a wrapper arranged to the inner tube. The figure illustrates furthermore the section and intensity profiles of the projected light beams intercepted at a virtual image plane defined in front of the light sensitive surface of a detector array.

FIG. 11 illustrates a detailed view of the illumination and light transmission of though-apertures 201-216, 220-228 of an inner tube 2 and a plurality of light beams that pass through an inner tube and a wrapper arranged to the inner tube. FIG. 11 illustrates furthermore the section of the light cones C1-C3 of a plurality of light beams 350 that are transmitted from the wrapper 2 to a detector array. As the emitted light cones C1-C3 are divergent light cones, the cross section 351-353, 351'-353' of the transmitted light beams 350 at the detector system 400 depend on the distance of the detector system 400 relative to the outer surface 40a of the wrapper. FIG. 11 illustrates the intensity variations I(θ) in a virtual image plane 402 defined in front of the detector array. The virtual image plane may be a plane or a curved plane, the latter being illustrated in the embodiment of FIG. 13. In preferred embodiments, the maximum intensities of said intensity variations I(θ) are provided by the light beams transmitted through the apertures 201-216, 220-228 and the minimal intensities are provided by scattered light passing through the wall of the inner tube 2 and the wrapper. The virtual image plane 402 may be defined at the light sensitive surface of a detector array, but may be situated at a distance in front of the detector array 401-414.

In embodiments, in order to improve the contrast of the intercepted light intensities I(θ) and also to reduce crosstalk between the different transmitted light beams, an array of pinholes or view angle-limiting apertures, made in an opaque material, may be arranged in front of the detector array. In such embodiment, that is not illustrated, the virtual image plane 402 is the plane of the array of pinholes or view angle-limiting apertures.

In an advantageous embodiment, a complementary light intensity distribution (not illustrated) to the one shown in FIG. 11 is possible. For example, the inner tube 2 may comprise a fluorescent substance that emits light upon radiation with for example UV light. In such a case, the light beams provided by the apertures 201-216, 220-228 may be much less visible, allowing to detect their presence as dark regions imposed on a substantial uniform light beam scattered by the wrapper. The apertures such an embodiment are then detected by dark areas in the intensity distribution. The effect may be considerably enhanced by using an optical filter arranged in front of the detector system 400. For example, a UV band pass filter may be used, in this case only light provided by the apertures is detected, providing an intensity signal having a great contrast. One may also use in front of the detectors 401-414 a visible light absorbing filter. In such a case, the apertures 201-216, 220-228 do not transmit light to the detectors 401-414, but are detectable by dips in the detected intensity signal provided by the visible light scattered by the wrapper towards the detector system 400.

The shape and contrast and the resolution of the intensity of the light beams impinging on the detector array 400 may be adapted in function of the desired optical effect.

The measured light intensity $I(\theta)$ can be optimized by adapting one or several of the following parameters:
- using the smallest distance between a wrapper 40 and the array of detectors;
- using a high number of sensors separated by small distances in order to precisely characterize the light variation versus their angular position e (for instance using a linear CCD, that may be a curved CCD or curved detector array);
- using sensor elements with a very small sensing area D in order to measure light at a precise location in the plane of the detector array 401-402 (FIG. 13);
- using dedicated materials that enhance the contrast of the light signal for example by using fluorescent or phosphorescent materials, or materials that have specific light absorption properties that may be combined by color or interference filters arranged to a detector array.

Figure 13:
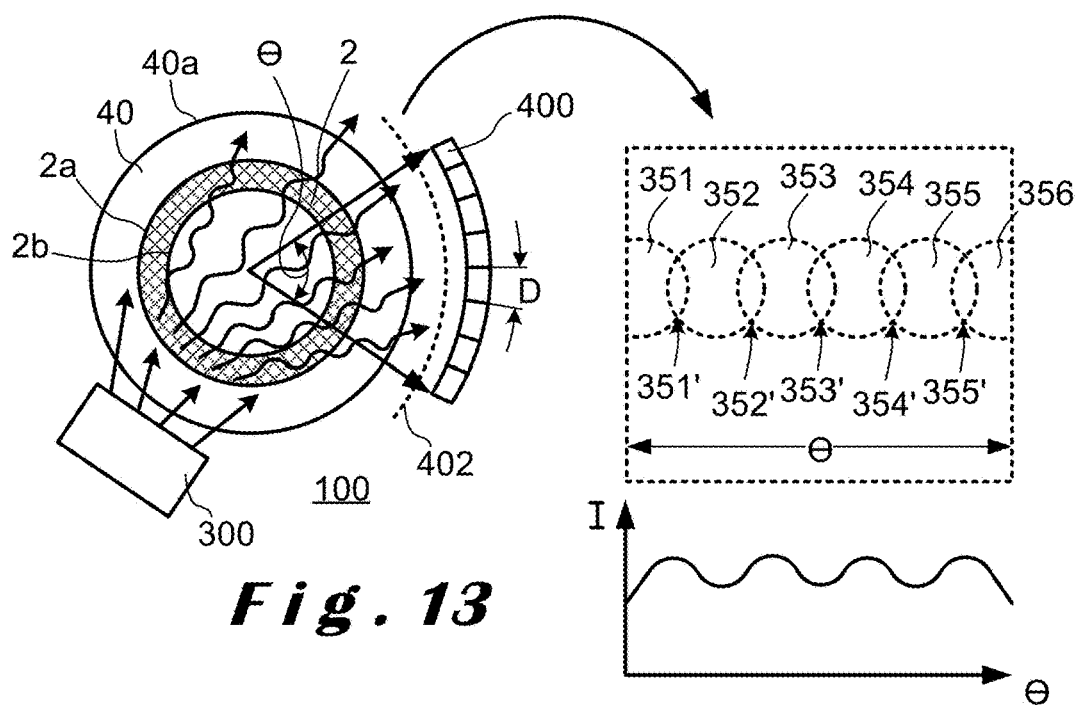
FIG. 13 illustrates a configuration of an aerosol generating device wherein a light source and an array of light detectors are arranged with an angle between 90° and 180° relative to an axis of a consumable article. The figure illustrates further the transmission of scattered light through an inner tube and through a wrapper.

In advantageous configurations, the widths of the light beams 351-353, 351'-354' intercepted by the detector array 401-415 may be adapted in function of their emission origin on the wrapper 40. For example, by adjusting the sizes of the holes or apertures 201-216, 220-216, the spacing distance to the detector array, or by using partial absorbing materials of the inner tube or by using papers that have specific light scattering properties, the cross sections of the projected light beams 351-353 provided by the apertures 201-216 may be different than the cross sections of scattered light beams 351'-354' that is not transmitted through the apertures 201-216, 220-216. The difference in cross-section size may be at least a factor of 2, even more than a factor of 5. FIG. 13, described further, illustrates another example of overlapping cross sections of light beams 351-355, 351'-355' intercepted by a detector array system 400

If the number of sensors 401-414 is small (for instance using 4 discrete sensors 401-415), an optimal location of those sensors along the light detection surface may be implemented in order to maximize the difference between the measured light intensities of light beams 351-356 provide by the apertures and light 351'-355' provided by the remaining surface of the inner tube 2.

Some exemplary arrangements of detectors 401-414 are now described.

Figure 14:
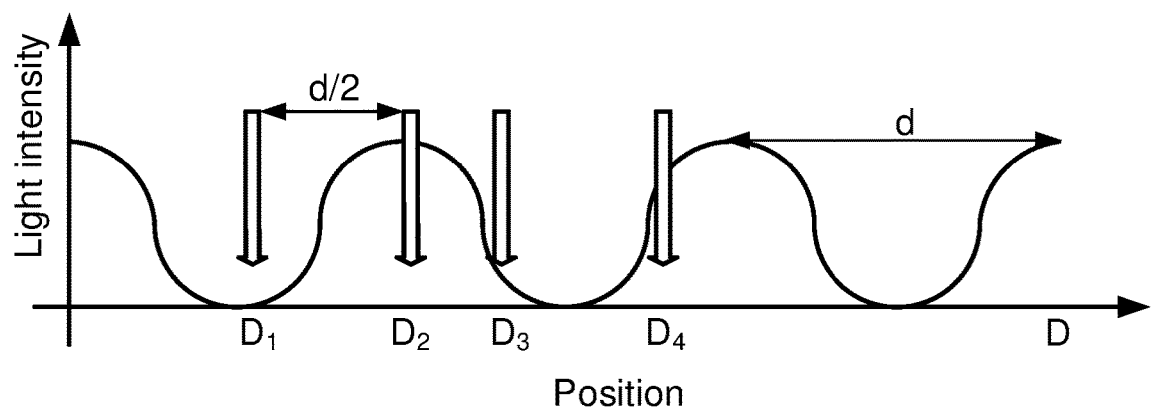
FIG. 14 illustrates the position of an array of detectors relative to projected light beams intercepted at the light sensitive surface of a detector array.
Figure 15:
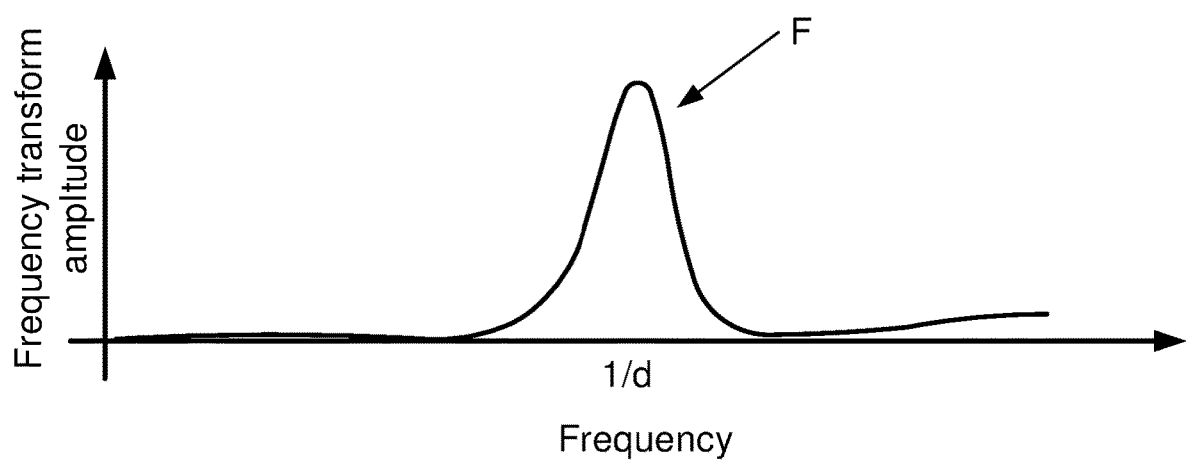
FIG. 15 shows a typical Fourier transform signal obtained by an arrangement of detectors such as the arrangement of FIG. 14.

For instance, FIG. 14 illustrates a situation wherein d is the distance between 2 successive maxima of the light that intersects the light sensitive surfaces of the detector array. If only 2 light sensors are used, then their respective location D1, D2 in the detector plane should be such that D2−D1=d/2. However, if by chance, the position of the sensor is at the transition between light and dark areas, the difference of intensity between both sensors will be low. To avoid this, additional sensors can be used.

If 4 sensors are used, then the positions of D3 and D4 of positions of the third and fourth sensors should be such that D3−D2=d/4 and D4−D3=d/2

The same reasoning applies for positioning optimally 6 or more sensors.

It is however possible to decrease the number of sensors to 3. Optimally placed, this allows the detection of the intensity variation over one period, and verification of the existence of the perforation or the structured pattern. In this case the 3 sensors are positioned such that D2−D1=d/2 and D3−D2=d/4. If I(x) is the light intensity in function of the position x, or $I(\theta)$ expressed as light intensity in function of an angle (FIG. 13), then a positive detection is performed when Max(I(D2)−I(D1), I(D3)−I(D2))>T, T being a threshold either hardcoded in the detection device (i.e. the aerosol generating device) or generated by the detection device based on other local or remote inputs.

It is also possible to use 2 groups of 3 sensors and each group can be optimized in order to detect modulation at respectively a distance d and d'. The first group is then set with distance such that D2−D1=d/2 and D3−D2=d/4 and the second group such that D2'−D1'=d'/2 and D3'−D2'=d'/4.

Also, a high number of sensors 401-414 may be used, for example more than 10 or more than 20 sensors. By using a great number of sensors that it is at least twice the number of bright and dark areas, then a signal processing approach can be used for a reliable detection. If I(Xn) is the light intensity measured at the uniformly sampled positions Xn defined in the detector plane, then a frequency transform F can be used for detection of the identification code or signal. F can be any transformed domain, and in particular a frequency transform like Fourier or DCT (discrete cosine transform). The maximum of the frequency transform signal F is located at the frequency 1/d which corresponds to the spacing of bright areas. Therefore, an advantageous detection method consists in measuring the signal to noise ratio of F(1/d) with the rest of the frequency transform values and comparing to a predefined threshold.

In a variant the same principle may be applied to the complementary optical configuration wherein the light beams provided by the apertures have a lower light intensity than the surrounding scattered light.

In advantageous embodiments, the detector array may comprise detectors having different shapes and the detector array may be arranged onto a curved substrate As the effect of the invention relies on the illumination of the inner tube 2 by scattered light, the position of the light source 310 is not critical and can be arranged anywhere around a circumference of a consumable as commented further in detail.

In variants, as illustrated in FIG. 13, a light source may be arranged at an angle relative to a detector system 400.

In an embodiment the angular aperture of the detectors 402-415, defined as the spatial light acceptation angle of these detectors, is chosen so that light from more than 2, preferably more than 5, more preferably more than 10, even more preferably more than 20 apertures 201-216, 220-228 and/or more than 2 arrays 20, 20', 20" of apertures 201-216, 220-228 may be detected by said optical reader system 400.

In a further complication of the approach, perforations have a non-uniform spacing, so that the transmitted intensity pattern represents an encoding of the consumable that could further be used for serialization or identification of a consumable article. With this complication more sensors are needed to correctly sample the encoding.

Some example of coded information that is provided by the apertures 201-216, 220-228 are now described.

FIG. 16a shows examples of a binary encoding using 4 lines of codes, enabling to encode 16 different values. The FIG. 16b shows a ternary encoding using lines of holes separated by a distance d or 2×d (using for instance 2 groups of 3 sensors as described above). This enables the encoding of $3^4=81$ different values. More generally, with n1 lines of holes, each line having n2 different spacings, the number of codes is equal to $(n2+1)^{n1}$ In an embodiment the detector system 400 is configured for detecting a spatial frequency and/or at least one optical phase (η) of said light beams.

In an embodiment said array of detectors comprises at least 3 detectors having different angular separations, defined relative to said cavity axis.

By adding several groups of sensors for each line, for example by using a 2D sensor array, it may also be possible to detect the phase between two lines of apertures 201-216, 220-228. For instance, the 2 lines in case (a) have a phase equal to 0, d/3 in case (b) and 2d/3 in case (c). This enables the encoding of 3 different values. It can be generalized to an arbitrary number of phases with enough sensors.

By combining both variants of different spacing values d, as illustrated in FIGS. 17*a-c* and different phase values, it is possibly to further increase the number of combinations.

It is highlighted here that intensity variations similar to those caused by the apertures 201-216, 220-228 as explained above, can also be created through alternative processes, such as:

printing of solid colours with holes, openings in the color. watermarking like technologies, that means, approaches where the paper thickness is varied.

Furthermore, a calibration sensor 400' which may be axially shifted, as illustrated in FIG. 18. The reading of the calibration sensor 400' will serve as a calibration signal and therefore allows to detect alternative coding such as ones produced by printing and watermarking.

Figure 19:
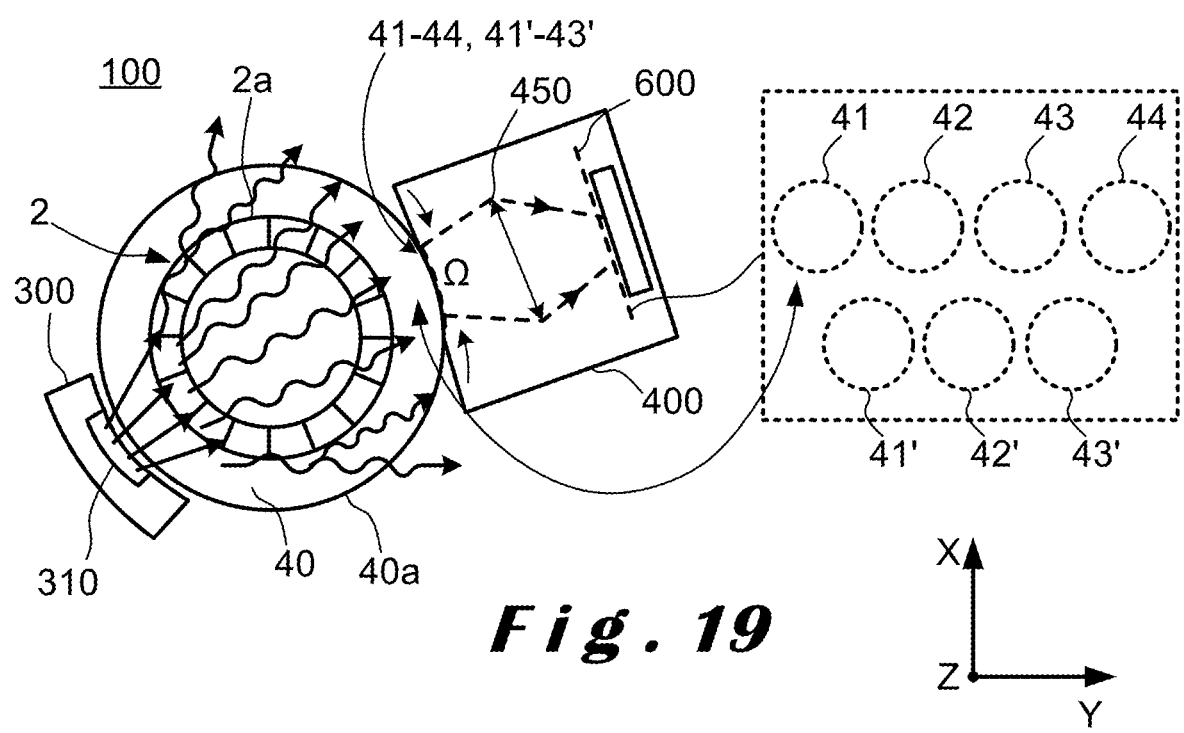
FIG. 19 illustrates an aerosol generating device comprising an illumination and imaging system for detecting and decoding information of a plurality of holes of an inner tube of an article of the invention. The figure illustrates an image of the emitted light beams at the level of the outer surface of a wrapper provided by the imaging system that is configured to provide an image of a portion of the outer surface of the wrapper.

In an advantageous embodiment, illustrated in FIG. 19, the apertures 20, 20', 20" of the inner tube 2 may be detected by the imaging of a portion of the wrapper 40. The light beams that are transmitted to the outer surface 40*a* of the wrapper 40 provide different illumination areas 41-44, 41'-43'. The imaging lens 450 may be chosen in function of the desired aperture Ω of the imaging system. The focal length of the lens 450 and the size of the imaging detector determine the area on the outer surface 40*a* of the wrapper that has to be imaged on the image plane 600. The choice of the focal length of the lens 450 depends also on the desired resolution in the image plane 600. The focal length may be smaller than 3 mm. The imager 400 as illustrated in FIG. 19 may be a very small imager having a volume of less than 4×4×4 mm. In embodiments an array of such very small imagers may be arranged to the cavity 102 of the device 100. In variants, a concave mirror may be used as an alternative to an imaging lens 450. This allows to provide a greater focal distance, and so a smaller field of view Ω but on the other hand a higher resolution. The use of an imaging system rather than the measurement of intensities if light beams can be particularly advantageous in the case of structures such as signs that have been pressed onto at least one of the surfaces of the inner tube 2.

The invention claimed is:

1. An aerosol-generating article, comprising a consumable section attached to a mouthpiece section,
wherein said mouthpiece section comprises at least one inner tube and a wrapper, wherein the at least one inner tube is arranged inside the wrapper, and
wherein the mouthpiece section further comprises a machine-readable pattern representing a coded data comprising a plurality of light transmitting apertures extending over at least a length in a wall of said at least one inner tube, said plurality of light transmitting apertures being arranged along a circumference and/or a longitudinal direction of said at least one inner tube.

2. The aerosol-generating article according to claim 1, wherein said at least one inner tube and/or said wrapper are made of a light-scattering material.

3. The aerosol-generating article according to claim 2, wherein said at least one inner tube and said wrapper are made of different materials and have different light scattering properties.

4. The aerosol-generating article according to claim 1, wherein said at least one inner tube and said wrapper are made at least partially of paper.

5. The aerosol-generating article according to claim 4, wherein said at least one inner tube and said wrapper have different thicknesses.

6. The aerosol-generating article according to claim 1, wherein at least one light absorbing layer is arranged to said at least one inner tube, said at least one light absorption layer having through-apertures that are aligned to said plurality of light transmitting apertures.

7. The aerosol-generating article according to claim 1, wherein said wrapper and/or said at least one inner tube is made of at least two layers.

8. The aerosol-generating article according to claim 7, wherein at least a portion of at least one of said layers is made of at least one of polylactic acid, cellulose paper, starch, or combinations thereof.

9. The aerosol-generating article according to claim 1, wherein said plurality of light transmitting apertures are arranged according to at least N parallel arrays arranged on the circumference of said at least one inner tube, N being equal or greater than 2.

10. The aerosol-generating article according to claim 9, wherein at least two of said at least N parallel arrays have M different separations between the respective apertures, M being equal or greater than 2.

11. The aerosol-generating article according to claim 9, wherein at least two of said at least N parallel arrays comprises respective apertures that are not aligned on a same virtual line that is orthogonal to a plane formed by said at least two of said at least N parallel arrays.

12. An aerosol-generating system comprising the aerosol-generating article according to claim 1, and an aerosol-generating device comprising a power supply section and a cavity-arranged in an outer body part; the cavity defining a cavity axis and having an opening accessible at the outer body part and being configured to receive said aerosol-generating article,
wherein
the aerosol-generating device further comprises at least one illumination system comprising at least one optical light source-arranged to a side of said cavity,
said aerosol-generating device-further comprising an optical reader system, comprising at least two detectors, for reading information provided by transmitted light transmitted through said plurality of light transmitting apertures.

13. The aerosol-generating system according to claim 12, wherein an angular aperture of the at least two detectors is chosen so that light from more than 2 of the plurality of light transmitting apertures and/or more than 2 arrays of the plurality of light transmitting apertures may be detected by said optical reader system.

14. The aerosol-generating system according to claim 12, wherein said optical reader system is configured for detecting a spatial frequency and/or at least one optical phase of said transmitted light.

15. The aerosol-generating system according to claim 12, wherein said at least two detectors comprises at least 3 detectors having different angular separations, defined relative to said cavity axis.

16. The aerosol-generating system according to claim 12, wherein at least one of said detectors has a greatest cross section smaller than a largest diameter of projected light beams on said detectors.

\* \* \* \* \*